July 21, 1953 A. W. VINCENT 2,646,473

MANUALLY OPERATED SELECTING AND CONTROLLING SWITCH APPARATUS

Filed April 25, 1950 2 Sheets-Sheet 1

INVENTOR.
ANDREW W. VINCENT

BY D. Clyde Jones

ATTORNEY

INVENTOR.
ANDREW W. VINCENT
BY
D. Clyde Jones
ATTORNEY

Patented July 21, 1953 2,646,473

UNITED STATES PATENT OFFICE 2,646,473

MANUALLY OPERATED SELECTING AND CONTROLLING SWITCH APPARATUS

Andrew W. Vincent, Rochester, N. Y., assignor to Talk-O Products, Inc., Rochester, N. Y., a corporation of New York Application April 25, 1950, Serial No. 157,956

7 Claims. (Cl. 200—1)

This invention relates to a manually operated selecting and controlling switch apparatus that is especially adapted for use in intercommunicating telephone systems.

In a widely used type of intercommunicating telephone system, there is provided an audio amplifier common to several stations each provided with a transducer or loudspeaker which serves both as a microphone and as a telephone receiver. In such a system means including a manually operated switch at each station normally connects its station to the output of the amplifier. When a party at a station desires to make a call, the switch thereat must be operated to connect this station to the input of the amplifier and the selected station is connected to the output of the amplifier. In the mentioned type of system, the party at the calling station can converse with the party at the called station, but when the called party desires to reply, the called station must be connected to the input of the amplifier and the calling station must be connected to the output of the amplifier. This reversal of the connection as the two parties exchange conversation, has been effected by a so-called talk-listen switch located at one of the stations, this switch being manipulated each time that the two parties alternately talk and listen.

From the foregoing, it will be understood that two separate switches are provided at each station, namely a selector switch and a talk-listen switch, each of which must be separately manipulated in effecting a given call. This operation of two separate switches is inconvenient for the user. In addition, the separate switches at each station of the system, have increased the bulk as well as the cost of the apparatus located thereat and have complicated the wiring of the apparatus in the system so that installation has been costly and difficult for the average installer.

The present invention has for its purpose the provision of a switching unit which combines both the function of a selector switch and a talk-listen switch whereby the manipulation of a single button in one step effects station selection and the further manipulation of this button in a second step controls the talk-listen function.

A further purpose of the invention relates to the provision of a switch construction of small size, the component parts of which are relatively inexpensive to manufacture and simple to assemble.

An additional purpose of this invention relates to the provision of a novel intercommunicating telephone system in which the present switch is an essential part.

Another purpose of the invention relates to the provision of a terminal panel for use in combination with the present switch in the intercommunicating system of this invention.

The various features and advantages of the invention will appear from the detailed description and claims when taken with the drawings, in which:

Figure 1:
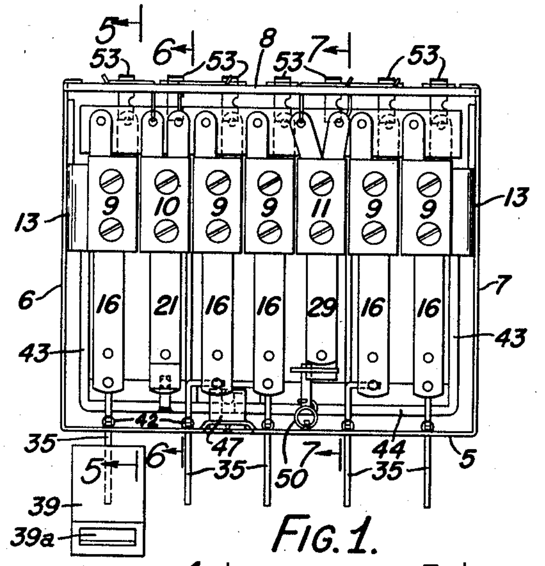
Fig. 1 is a plan view of the swtich of this invention with certain of the actuating buttons omitted therefrom for the sake of clearness.
Figure 5:
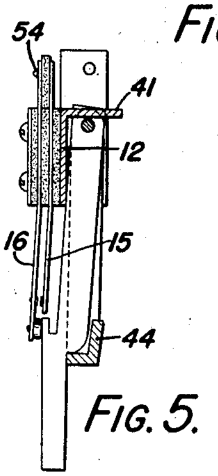
Figure 6:
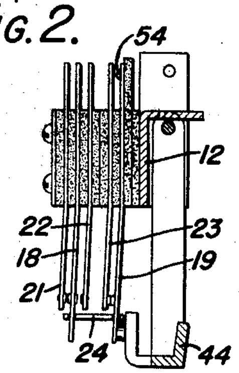
Figure 7:
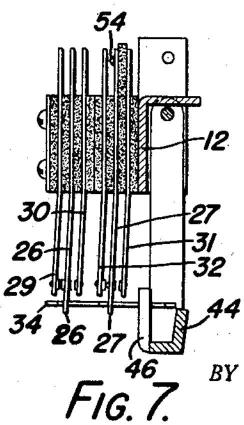
Figure 7A:
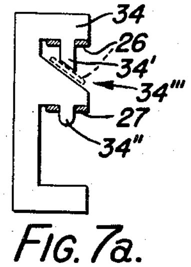
Figures 8, 9, 10, 11, 12:
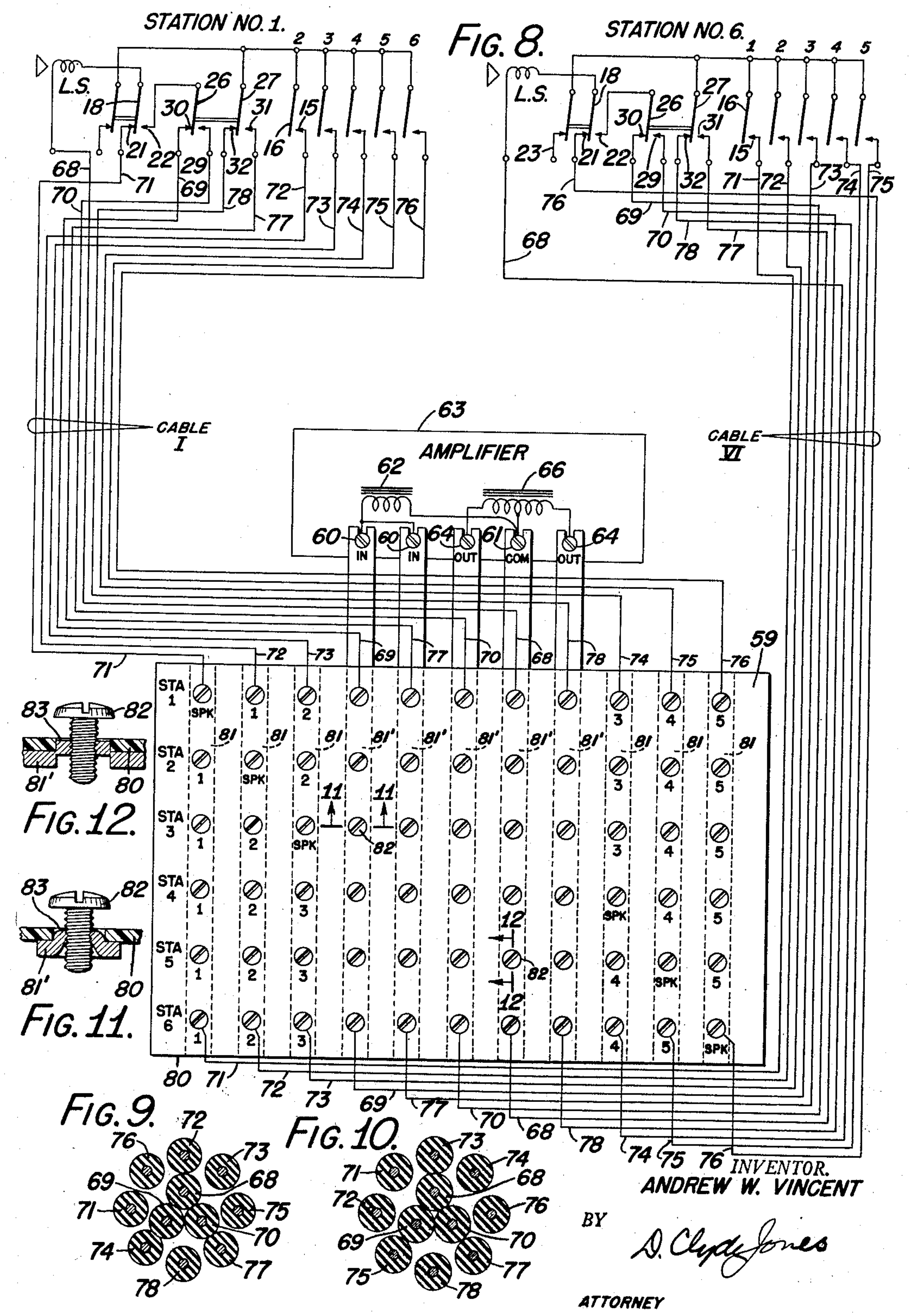

Figs. 5, 6 and 7 are vertical sections taken substantially on the lines 5—5, 6—6 and 7—7 respectively of Fig. 1, particularly illustrating the different types of contact spring stacks employed in the present switch; Fig. 7*a* is a detail view of a portion of Fig. 7;

Fig. 8 is a diagrammatic showing of an intercommunicating system incorporating switches of the present invention and also the terminal panel of this invention;

Fig. 9 is a cross-section through the cable which connects station No. 1 to the terminal panel;

Fig. 10 is a similar cross-section through the cable connecting station No. 6 with the terminal panel, particularly illustrating the arrangement of the several conductors in the respective cables; and Figs. 11 and 12 illustrate fragments of the terminal panel taken substantially on the lines 11—11 and 12—12 of Fig. 8, particularly showing the contour of each embossing of a terminal strip.

Figs. 1 to 8 of the drawings illustrate a preferred form of the switch of this invention, adapted to be located at a station of an intercommunicaitng system for selective connection with five other stations each equipped with a similar switch. This switch has a combined rectangular frame and housing including a U-shaped frame member of sheet metal comprising a front 5 as well as sides 6 and 7. The free ends of the sides 6 and 7 have fastened thereto, a rigid terminal strip 8 of insulating material preferably equal in width to the width of the sides and front, to complete the rectangle. This construction provides a rigid, rectangular unit for mounting and enclosing the five sets of selector spring assembly stacks 9 each of which is individual to one of five stations and in addition two spring assembly stacks 10 and 11 common to all of the selector spring stacks of the switch. These stacks are all secured in side-by-side parallel relation on the horizontal portion 12 of an angular supporting bar which has its downturned ends 13 fastened as by screws (not shown) to the sides 6 and 7 of the housing. Each of these selector spring assembly stacks (Fig. 5) comprises a back contact spring 15 and a swinger contact spring 16 arranged in parallel relation with an insulating strip at the surfaces of their back ends. The insulated ends of these springs are rigidly secured to the horizontal portion of the rigid contact supporting bar 12. The free ends of the springs 15 and 16 are normally out of engagement, with the free end of the swinger spring 16 projecting beyond the free end of spring 15.

The spring stack 10 (Fig. 6), in which the contact springs thereof are insulatedly mounted in the same manner as the stacks 9, includes two spaced swingers 18 and 19 normally biassed downward. The upper swinger 18 is located between its back contact spring 21 and its front contact spring 22. While the lower swinger 19 cooperates with the back contact spring 23 (not utilized in the system of Fig. 8). The front ends of the swingers 18 and 19 project beyond the related ends of their contact springs and are connected by an insulating spacer 24. Thus, when a restoring force is applied to the free end of swinger 19 the spacer 24 will transmit this force to the free end of swinger 18. It will be understood that the spring stack 10 which is common to the five selector stacks 9, has its swingers operated whenever the swinger of any selector stack of the switch, is actuated.

The talk-listen contact spring stack 11 (Fig. 7) likewise has the back ends of its springs insulated from each other and from the supporting bar on which the stack is mounted. This stack comprises two swingers 26 and 27, the swinger 26 being located between its front contact spring 29 and the back contact spring 30, while the swinger 27 is located between its front contact spring 31 and its back contact spring 32. The free ends of the swingers 26 and 27 which are normally biassed toward their respective back contact springs, project beyond their related springs. The projecting ends of these swingers are hooked together by an insulating piece 34 so that they move as a unit. The piece 34 (Fig. 7*a*) is provided with hooks 34′, 34″ respectively engaging openings in the free ends of the swingers 26 and 27. It will be noted that there is an upwardly inclined entrance 34‴ leading to the hook 34′. Thus while the piece 34 is being applied to the swingers 26 and 27, the free end of the swinger 26 must be distorted to the position shown in dotted lines. However, when the piece 34 is assembled on the free ends of the swingers 26 and 27, as shown in full lines, the elements are properly alined and part 34 is retained in assembled relation without the need of an additional retaining spring.

The swinger of each selector contact spring stack which is biassed away from its contact, is normally held in engagement therewith by its individual key lever 35, mounted to swing downward (Fig. 2) when its front end is depressed downwardly. All of the levers 35 have their remote ends pivoted on a shaft 36 which has its respective ends anchored in the downturned ends 13 of the bar 12. The forward end of each key lever projects through a vertical guide slot 38 in the front 5 to terminate in a button 39. Each button has a recess 39*a* to receive a card bearing the designation of a called station. The remote end of each lever also swings in an individual vertical guide slot (not shown) in the vertical flange 41 of the contact stack supporting bar 12. It will be understood that the length of the front slot determines the arc of movement of its key lever 35. Each key lever is normally returned to its upper position as shown in Fig. 3 by an individual coil spring 42 having its ends respectively connected to the actuator and to a hook turned inward from the material of the front.

There is also pivotally mounted on the shaft 36, the free ends of the side arms 43 of a rocker frame comprising the angle-iron cross-bar 44 which extends under all of the key levers and is arranged so that the downward movement of any key lever will tend to rock the cross-bar of the frame downward. A lug 46 carried by the vertical part of the cross-bar 44, extends inwardly to hook over the lower part of the insulating piece 34 so that as the cross-bar is forced down by the depression of any lever 35, this insulating piece pulls the swingers 26 and 27 of the talk-listen stack downward (Fig. 3), with the swinger 27 working its related contact before the swinger 26 works its related contact. This reverses the position of these swingers from engagement with their respective back contacts to engagement with their respective front contacts.

Figure 4:
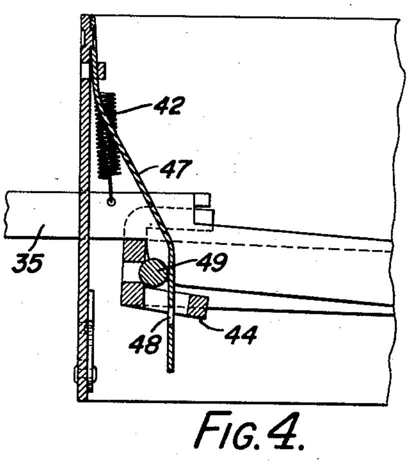
Fig. 4 is a fragmentary section, with the contact spring stacks omitted, taken substantially on the line 4—4 of Fig. 2.

It will be noted from Fig. 4 that the inner surface of the front 5 of the frame, carries the upper end of a flat detent spring 47, the lower portion of which is bent away in spaced relation to the frame. The lower end of this spring has an opening 48 therein adapted to be engaged by a ball 49 freely carried in a round hole in the cross-bar 44. This ball in cooperation with the opening in the spring 47, serves as a detent which provides indication by touch, to the person depressing any button, when a key lever is in its intermediate position as the lever is moved downward. A spring 50 having its end respectively connected to the front 5 and the rocker frame, tends to restore this frame to its upper position as shown in Fig. 3.

Figure 2:
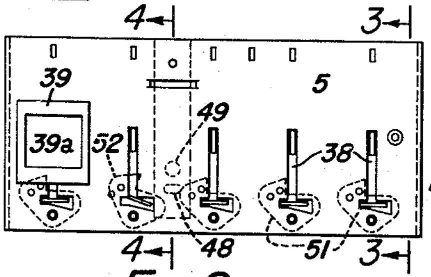
Fig. 2 is a front elevation of the present switch.
Figure 3:
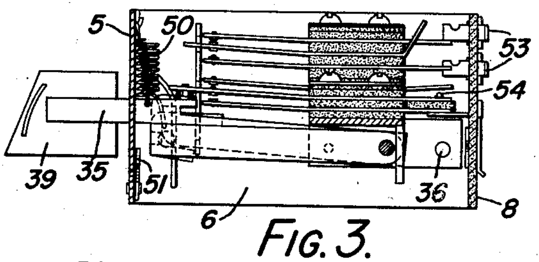
Fig. 3 is a vertical sectional view taken on the line 3—3 of Fig. 2.

It will be seen especially in Figs. 2 and 3 that there is provided a stop 51 for each key lever, adjustably mounted on the inner surface of the front 5. The stop is of such shape that when it is rotated to the position indicated at 52 (Fig. 2), it will project into the path of its key lever to limit the downward movement thereof to the first step only. However, when a stop is in the positions indicated by the remaining key levers, its individual key lever can move downward in two steps. It will be understood that by restricting the downward movement of the key levers, to a first step, the station associated therewith will be prevented from listening in on a conversation at the remote selected station. This feature is desirable in certain intercommunicating systems but is not used in the system of Fig. 8.

The insulating terminal strip 8 at the back of the frame is apertured to receive terminal connections 53, each having a contact projecting therethrough adjacent to the tail of the several of the contact springs so that it is merely necessary to solder these respective parts together without the need of connecting wires. However the tails of the several contact springs 16, 19 and 27 are soldered in common to the conducting strip 54 shown in Figs. 3, 5, 6 and 7 but omitted from Fig. 1 for simplifying that view.

The selecting and controlling switch apparatus, described above, can be used in various types of intercommunicating telephone systems but is especially adapted for use in the system diagrammatically illustrated in Fig. 8. In this system shown, there are provided six stations, each of which stations has a switch unit (Figs. 1 to 7) as described above, and a transducer or loudspeaker LS of the permanent magnet type for talking and listening. The switch unit of a given station has five key levers 35 with their respective actuating buttons 39, individual to each of the remaining stations of the system. It will be understood that the switch unit of a given station does not need to have a button and a key lever, individual to itself.

Each of the six stations has its switch unit connected by an eleven-conductor cable, to a distributing panel 59 through which the conductors of the cable of each station are respectively coupled through input terminals 60, 60 and to the common terminal 61, to the input transformer 62 of an audio amplifier 63 of the vacuum tube type, and to an output terminal 64, 64 as well as to the common terminal 61 leading to the midpoint of the output transformer 66 of the amplifier. This audio amplifier may be similar to that shown in applicant's copending application Serial No. 72,692, filed January 25, 1949, now Patent No. 2,523,671, issued September 26, 1950.

The eleven conductor cable for station No. 6 (Fig. 10), has a central core of three twisted conductors comprising the common conductor 68, the calling input speaker conductor 69 and the calling speaker output conductor 70. Surrounding this core, there are eight conductors twisted in the reverse direction from the conductors of the core. These eight conductors comprise five station selector conductors 71, 72, 73, 74 and 75, as well as a speaker conductor 76 together with a called speaker input conductor 77 and a called speaker output conductor 78. The arrangement of the conductors in the cable for station No. 1 (Fig. 9) while similar to the arrangement of similar conductors in the cable for station No. 6, is slightly different therefrom. The other four cables for the four remaining stations, are similar to the cables already described but the necessary changed arrangement of conductors in each cable will be understood from Figs. 9 and 10. This arrangement of the conductors in each cable, enables the alternate connection of the speakers at the calling and called stations respectively to the input circuit and to the output circuit of the amplifier to provide "talk-listen" operation without disturbing the inductive balance of the system. This arrangement of the several conductors in the cable corrects any capacitive unbalance in the system by connecting the output conductor 70 in the core in "out-of-phase" relation with the output conductor 78 which is one of eight conductors twisted on the outside of the core. It will be understood that the cable of a given station has no station selector conductor for that station. It will also be understood that each piece of individual cable is cut from a long length of cable so that each of the individual cables is physically the same in construction but the wires of the several individual cables are differently connected at the panel and at the stations.

The distributing panel 59 comprises a rectangular sheet 80 of insulation suitably provided with vertical and horizontal rows of holes with six holes in a vertical row and eleven holes in a horizontal row. Each vertical row of holes has a common conducting bar such as 81 and 81′ provided with tapped holes to register with a vertical row of holes. A screw 82 passing through a hole in the panel and screwed into a registering hole in the bar 81 conductively connects one of the conductors of a cable to the bar. The bars 81 are coextensive in length with the width of the sheet 80 but the bars 81′ extend beyond the sheet 80 and have their upper ends notched to receive the respective screw terminals 60, 60, 64, 61 and 64 on the amplifier. The several legends as well as the numerals 1 to 5 marked on the panel, indicate how the several conductors of the different cables are to be connected to the various terminals on the panel. The specific construction of each bar will be understood from Figs. 8, 11 and 12. From these figures it will be seen that the bar is cut to the desired length from strip metal. The bar is then embossed at each point thereon where there is to be a hole and the hole is then tapped to receive a terminal screw. The embossing is effected by a tool having a narrow rectangular face of a length so that the ends of the embossing will fit in the hole in the panel. Preferably the depth of the embossing is slightly less than the thickness of the panel. Thus when a conductor is to be connected to a bar, the conductor is firmly gripped between the embossing and the terminal screw, screwed therein.

In the operation of the system let it be assumed that the party at station No. 6 desires to call station No. 1. The key lever for station No. 1 is depressed to its first stage thereby closing spring contacts 15, 16. At the same time the swinger 18 at the calling station No. 6 is disconnected from the back contact 21 and is connected to the front contact 22. The operations just described are effective to connect the loudspeaker LS at station No. 6 to the input of the amplifier by a circuit which may be traced from one terminal of the winding of the loudspeaker, swinger spring 18 and front contact 22, swinger 26 and back contact 30 of the talk-listen switch in its first position, conductor 69, terminal bar 81′, input terminal 60 of the amplifier, primary winding of the transformer 62 in the input of this amplifier, common terminal 61 of the amplifier, through the common terminal strip, conductor 68, to the terminal of the loudspeaker winding. The loudspeaker of the wanted station No. 1 is connected to the output of the amplifier in a circuit extending from one terminal of the loudspeaker winding, swinger 18 and back contact 21, conductor 71, through a terminal strip at the terminal panel, conductor 71 leading to station No. 6, front contact 15 and swinger contact 16 of the depressed No. 1 key at station No. 6, swinger contact 27 and back contact of the talk-listen contacts at station No. 6, conductor 78, output terminal 64 of the amplifier, through the right-hand portion of the secondary winding of the output transformer 66 of the amplifier and common terminal 61, through the common terminal strip, conductor 68 to the other terminal of the loudspeaker winding at station No. 1.

The calling party at station No. 6 calls the name of the wanted party, through the loudspeaker LS and through the circuits of the amplifier as just described to the loudspeaker LS at the wanted station No. 1. The called party at station No. 1 can listen to the party at station No. 6. If the party at station No. 6 wants a reply from the party at station No. 1, the talk-listen key at station No. 6 is depressed to its second position. By this operation the loudspeaker at station No. 6 is connected to the output of the amplifier and the loudspeaker at station No. 1 is connected to the input of the amplifier. The circuit for this connection may be traced from the terminal of the loudspeaker winding, swinger contact spring 18, front contact 22, swinger 26 and front contact 29 of the talk-listen key, conductor 70, output terminal of the panel board, terminal 64 of the amplifier, through the left-hand portion of the secondary winding of the output transformer 66, conductor 68, to the other terminal of the mentioned loudspeaker winding. The circuit for connecting the winding of the loudspeaker at station No. 1 extends from the terminal of this speaker, conductor 71, through the No. 1 terminal strip at the terminal panel, conductor 71, front contact 15 and swinger contact 16 of the depressed key at station No. 6, swinger contact 27 and front contact 31, conductor 77, through the terminal strip at the panel board, input terminal 60 of the amplifier, through the input transformer 62 of the amplifier to the common terminal 61 of the amplifier thence through conductor 68 to terminal of loudspeaker. When the calling party at station No. 6 desires to resume conversation, the talk-listen switch is released to its first position so that station No. 6 is connected to the input of the amplifier and station No. 1 is connected to the output of the amplifier. The manipulation of the talk-listen switch contacts at station No. 6 enables the two parties to inter-exchange conversation.

It has been mentioned that the swinger 27 and the swinger 26 operate in a predetermined sequence with respect to their related contacts. This enables the talk-listen switch at a given station to reverse the connections of the calling and called loudspeakers with respect to the input and output of the amplifier without causing objectionable noises in these loudspeakers. For example, when the talk-listen switch at the calling station No. 6 is moved to its listen position the swinger 27 at that station first disconnects the loud-speaker at the called station from the output of the amplifier and connects it to the input thereof. Momentarily, the swinger 26 at the calling station leaves the loudspeaker of the calling station also connected to the input of the amplifier and lastly the loudspeaker of the calling station No. 6 is connected to the output of the amplifier. Thus, at no time during the talk-listen switching, is there any interruption of the input circuit to the amplifier which could cause a severe switching transient.

What I claim is:

1. In a switching unit, a group of contact spring stacks, a key lever individual to each stack, a member common to said key levers and arranged to be selectively actuated to two different positions by the operation of any one of said keys, a first stack of contact springs common to said group of contact spring stacks, a second stack of contacts common to said group of stacks, and means including said member for operating one of said common stacks in the first position of said member and for operating the other common stack in the second position of said member.

2. In a switching unit, a group of contact spring stacks, a key lever individual to each stack, a member common to said key levers and arranged to be selectively actuated in one direction to two different positions by the operation of any one of said keys, a first stack of contact springs common to said group of contact spring stacks, a second stack of contacts common to said group of stacks and means including said member for operating one of said common stacks in the first position of said member and for operating the other common stack in the second position of said member.

3. In a switching unit, a group of contact spring stacks, a rocking key lever individual to each stack, a shaft on which said levers rock, a member common to said key levers and arranged to rock in the same direction on said shaft to two different positions by the operation of any one of said keys, means including a yieldable detent for indicating the first position, a first stack of contact springs common to said group of contact spring stacks, a second stack of contacts common to said group of stacks, and means including said member for operating one of said common stacks in the first position of said member and for operating the other common stack in the second position of said member.

4. In a switching unit, a group of contact spring stacks, a rocking key lever individual to each stack, a shaft on which said levers rock in the same direction to two different positions, a member common to said key levers and arranged to rock in the same direction therewith on said shaft to two different positions by the operation of any one of said keys, a first stack of contact springs common to said group of contact spring stacks, a second stack of contacts common to said group of stacks and means including said member for operating one of said common stacks in the first position of said member and for operating the other common stack in the second position of said member, a yieldable detent for indicating said first position of the levers, and a fixed stop for indicating the second position of said levers.

5. In a switch unit, a group of contact spring stacks, a rocking key lever individual to each stack, a shaft on which said levers rock, a member common to said key levers and arranged to rock in the same direction on said shaft to two different positions by the operation of any one of said keys, means including a yieldable detent for indicating the first position, a first stack of selector switching contact springs common to said group of contact spring stacks, a second stack of talk-listen contacts common to said group of stacks, and means including said member for operating said selector switching contact spring stack in the first position of said member and for operating the talk-listen contact stack together with selector switching contact spring stack in the second position of said member.

6. In a switching unit in accordance with claim 1 wherein one of the contact spring stacks comprises a pair of spaced swinger springs each provided with an apertured end, at least one contact spring cooperating with each swinger spring, and an insulating piece for simultaneously moving the apertured ends of said swinger springs with respect to their related contact springs, said insulating piece having hooks to engage the respective apertures in said swinger springs and means forming a part of said piece for retaining it on at least one of said swinger springs.

7. In a switching unit in accordance with claim 1 wherein one of the contact spring stacks comprises a pair of spaced flexible swinger springs each provided with an apertured end, at least one contact spring cooperating with each swinger spring, all of said springs being insulatedly mounted in superimposed parallel planes, and means for simultaneously operating said swinger springs, said means comprising an insulating strip having hooks respectively engaging the apertures in said swinger springs, said piece having an inclined slot leading to one of said hooks whereby said hook can be introduced into or disengaged from the aperture in its swinger spring only by distorting this last mentioned swinger spring from its normal plane so that the insulating piece is securely retained on said swinger springs.

ANDREW W. VINCENT.

References Cited in the file of this patent

UNITED STATES PATENTS

| Number | Name | Date |
|---|---|---|
| 1,789,142 | Knos | Jan. 13, 1931 |
| 2,108,817 | Davis | Feb. 8, 1938 |
| 2,242,971 | Glennon | May 20, 1941 |
| 2,312,408 | Hansen | Mar. 2, 1943 |
| 2,411,576 | Kelleigh | Nov. 26, 1946 |
| 2,450,001 | Humphries | Sept. 28, 1948 |
| 2,451,602 | Wolff et al. | Oct. 19, 1948 |
| 2,490,963 | Hofgaard | Dec. 13, 1949 |
| 2,509,701 | Smith | May 30, 1950 |
| 2,517,259 | Tschumi | Aug. 1, 1950 |